United States Patent
Onimaru et al.

(10) Patent No.: US 6,861,797 B1
(45) Date of Patent: Mar. 1, 2005

(54) GREEN PHOSPHOR AND DEVICE USING THE SAME

(75) Inventors: Toshiaki Onimaru, Kawasaki (JP); Shinya Fukuta, Kawasaki (JP); Tomonari Misawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/842,432

(22) Filed: May 11, 2004

(30) Foreign Application Priority Data

Dec. 10, 2003 (JP) ........................ 2003-411958

(51) Int. Cl.$^7$ .................. H01J 11/02; C09K 11/54; C09K 11/64
(52) U.S. Cl. ............... 313/486; 313/485; 252/301.4 R; 252/301.6 R
(58) Field of Search .................. 313/467, 485, 313/486, 502, 503; 252/301.4 R, 301.6 R

(56) References Cited

U.S. PATENT DOCUMENTS 6,096,243 A * 8/2000 Oshio et al. .......... 252/301.4 R

FOREIGN PATENT DOCUMENTS

JP          2002-173677          6/2002

* cited by examiner

Primary Examiner—Nimeshkumar D. Patel
Assistant Examiner—Sharlene Leurig
(74) Attorney, Agent, or Firm—Staas & Halsey LLP

(57) ABSTRACT

A green phosphor represented by the formula: $A(Zn_{1-x}Mn_x)Al_{10}O_{17}$ wherein A is Ca, Ba or Sr and x is a number satisfying $0.02 \leq x \leq 0.14$.

6 Claims, 5 Drawing Sheets

GREEN PHOSPHOR AND DEVICE USING THE SAME

CROSS-REFERENCE TO RELATED APPLICATION

This application is related to Japanese application No. 2003-411958 filed on Dec. 10, 2003, whose priority is claimed under 35 USC §119, the disclosure of which is incorporated by reference in its entirety.

BACKGROUND OF THE INVENTION

1. Field of the Invention

The present invention relates to a green phosphor and a device using the same, more particularly to a green phosphor capable of converting a light applied into a light having a lower energy (a longer wavelength) and to a device using the green phosphor. The green phosphor of the present invention can be used suitably for gas discharge devices such as fluorescent lamps and display devices such as plasma display panels (PDPs).

2. Description of the Related Art

Phosphors are used widely in a variety of fields. For example, they are used for lighting devices such as fluorescent lamps, displays such as PDPs and X-ray camera tubes. For example in color display devices, three color phosphors, namely, a red, blue and green phosphors are used. By combining the fluorescences from the three color phosphors, a white color is produced. In particular, a green phosphor is an important one which determines the luminance of a white color. Therefore, the provision of a green phosphor which is capable of producing fluorescence of a high luminance and of a high color purity is awaited.

As conventional green phosphors, $(Ba, Mn)Al_{12}O_{19}$, $(Y, Tb)BO_3$, and $Zn_2SiO_4:Mn$ are well known. Moreover, though a blue phosphor, a phosphor represented by $(BaMgAl_{10}O_{17}:Eu^{+2}$ in which part of Mg is replaced by Ca, Cu, Zn, Pb, Cd, Mg and Sn is also known (Japanese Unexamined Patent Publication No. 2002-173677).

Of the green phosphors mentioned above, $(Ba, Mn)Al_{12}O_{19}$ is high in color purity but low in luminance. On the other hand, $(Y, Tb)BO_3$ is high in luminance but low in color purity.

$Zn_2SiO_4:Mn$ is better balanced between color purity and luminance than the green phosphors mentioned above and therefore are widely used in display devices such as PDP.

However, even the color purity and luminance of $Zn_2SiO_4:Mn$ are insufficient and further improvements in color purity and luminance are awaited.

SUMMARY OF THE INVENTION

Accordingly, the present invention provides a green phosphor represented by the formula:

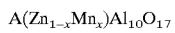

wherein A is Ca, Ba or Sr and x is a number satisfying $0.02 \leq x \leq 0.14$.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EXAMPLES

The present invention is described below.

At first, a green phosphor of the present invention is represented by the formula:

wherein "A" is Ca, Ba or Sr, and x is a number satisfying $0.02 \leq x \leq 0.14$. In the above formula, "A" is only required to include at least one of Ca, Ba and Sr. It may include two or all of the elements. The case where x is smaller than 0.02 or x is larger than 0.14 is undesirable because the luminance may be lower than that of $Zn_2SiO_4:Mn$, which is a conventional green phosphor. More preferably, x ranges from 0.04 to 0.10.

Next, "A" is preferably Ba, Sr or both. Thus, this preferred green phosphor can be expressed in the following formula: $(Ba_{1-y}Sr_y)(Zn_{1-x}Mn_x)Al_{10}O_{17}$ ($0.02 \leq x \leq 0.14$, $0 \leq y \leq 1$).

The inventors have found that the luminance of the green phosphor is improved when A contains Sr. In particular, when y is within the range of from 0.25 to 0.50, the green phosphor possessing both a high luminance and a high color purity is provided.

It is noted that part of Zn may be replaced by Mg unless the effect of the green phosphor of the present invention is affected. Furthermore, although the green phosphor of the present invention contains $AZnAl_{10}O_{17}$ as a host material and Mn as a luminescence center, the host material may be combined with other host materials such as $CaAl_{12}O_{19}$ and $SrAl_{12}O_{19}$ in an appropriate proportion so as to form a mix crystal.

Figure 1:
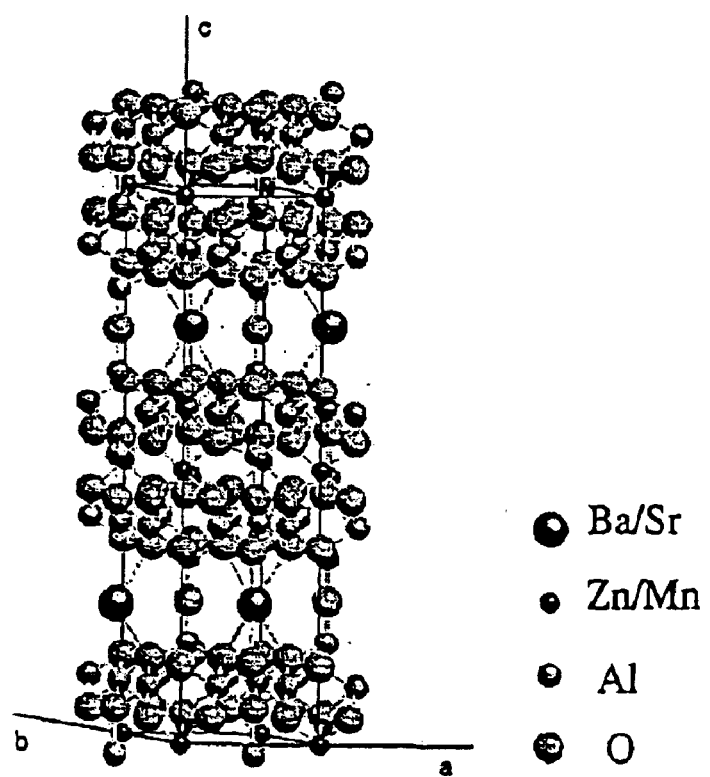
FIG. 1 is a schematic view of the β alumina structure.

The green phosphor of the present invention may have any crystal structure as long as it exhibits a higher luminance and a higher color purity than those of conventional green phosphors. However, the inventors have found that a high luminance and a high color purity are exhibited by many of the green phosphors in which, of the host materials and luminescence centers forming the green phosphors, the host materials have a β alumina structure shown in FIG. 1.

There is no particular limitation regarding the wavelength of the light which is applied for extracting fluorescence from the green phosphor of the present invention. However, in display devices such as plasma display panels (PDP), preferred is a wavelength within the vacuum ultraviolet region.

Furthermore, to the green phosphor of the present invention may be mixed other green phosphors listed below:

(1) a green phosphor that has a magnetoplumbite-type crystal structure which contains at least Mn, La and Tb.

(2) a green phosphor that has a magnetoplumbite-type crystal structure which contains at least Tb and La but does not contain Ce.
(3) a green phosphor that has a magnetoplumbite-type crystal structure which contains at least Mn, La and Zn.

Many of the other green phosphors have a luminance greater than that of the green phosphor of the present invention. Therefore, the mixing of them with the green phosphor of the present invention can further improve both the color purity and the luminance.

Specific examples of such other green phosphors include:
for (1), $LaMgAl_{11}O_{19}$:(Mn, Tb), $La_xAl_yO_z$ (x:y:z=0.5 to 1.2:11 to 12:18 to 19.5) and the like;
for (2), $LaMgAl_{11}O_{19}$:Tb, $LaMgAl_{11}O_{19}$:(Mn, Tb) and the like: and
for (3), $LaMgAl_{11}O_{19}$, $(La_{1-x}Tb_x)_y$ $(Mg_{1-a-b}Mn_aZn_b)$ $Al_zO_{1.5(z+y)+1}$ (in the) formulas, $0 \leq x \leq 0.5$, $0.8 \leq y \leq 1.2$, $0 \leq a+b \leq 1$, $8 \leq z \leq 30$) and the like.

The green phosphor of the present invention may be formed by a known method. For example, compounds containing "A", Zn, Mn and Al are weighed so that these elements are contained in desired molar ratios. These compounds are sintered and the resulting sinter of a green phosphor is pulverized and classified to give a green phosphor having a desired particle size.

Particularly, the sintering can be performed at a temperature of 1300 to 1700° C. for 1 to 10 hours under a nitrogen atmosphere. For lowering the above temperature, a reaction accelerator composed of a halide such as $AlF_2$, $MgF_2$, LiF and NaF may be used unless the effect of the present invention is affected. The other green phosphors may also be formed in a manner similar to that for the green phosphor of the present invention.

The green phosphors of the present invention may be used for luminaries such as fluorescent lamps, display devices such as PDPs, CRTs, fluorescent display tubes and X-ray camera tubes and the like. In the following examples, green phosphors according to the present invention are applied to a PDP shown in FIG. 2.

Figure 2:
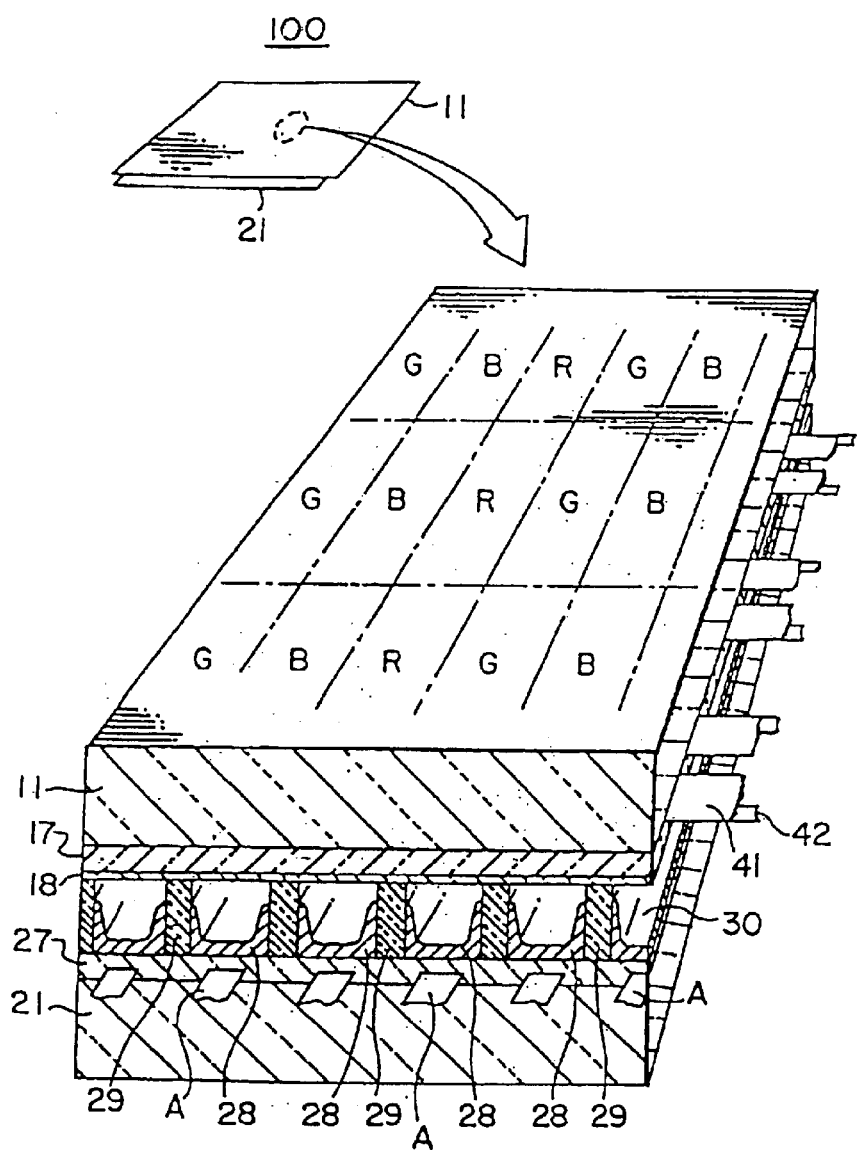
FIG. 2 is a schematic perspective view of a PDP.

FIG. 2 shows an AC-driven surface discharge PDP with three electrodes. The present invention is applicable not only to this type of PDP but also to any type of PDP that has a green phosphor. For example, a PDP may be not only AC-driven but also DC-driven and may be of reflection type or of transmission type.

The PDP 100 of FIG. 2 is composed of a front plate and a rear plate.

First, the front plate usually includes a plurality of display electrodes formed on a substrate 11, a dielectric layer 17 formed to cover the display electrodes and a protecting layer 18 formed on the dielectric layer 17 and exposed to a discharge space.

The substrate 11 is not particularly limited and a glass substrate, a quartz glass substrate, a silicon substrate and the like maybe mentioned.

The display electrodes comprise transparent electrodes 41 such as of ITO, and bus electrodes 42 (for example, having a three-layer structure of Cr/Cu/Cr) may be formed on the transparent electrodes 41 for reducing the resistance of the display electrodes.

The dielectric layer 17 is formed of a material commonly used for PDPs. Particularly, the dielectric layer 17 may be formed by applying a paste of a low-melting glass and a binder onto the substrate, followed by sintering.

The protecting layer 18 is provided for protecting the dielectric layer 17 from damage due to ion collision caused by discharge for display operation. The protecting layer 18 may be formed, for example, of MgO, CaO, SrO, BaO or the like.

Next, the rear, plate usually includes a plurality of address electrodes A formed on a substrate 21 in a direction perpendicular to the display electrodes, a dielectric layer 27 covering the address electrodes A, a plurality of stripe-shaped ribs 29 formed on the dielectric layer 27 between the address electrodes A and phosphor layers 28 formed between the ribs 29 and also covering sidewalls of the ribs.

The substrate 21 and the dielectric layer 27 may be formed of the same materials as those of the substrate 11 and the dielectric layer 17 of the front plate.

The address electrode A is formed, for example, of a metal layer of Al, Cr, Cu or the like or a three-layer structure of Cr/Cu/Cr.

The ribs 29 can be formed by applying a paste of a low-melting glass and a binder onto the dielectric layer 27, followed by drying, and cutting the dried paste by sandblasting. If a photosensitive resin is used as the binder, the ribs 29 can also be formed by exposing and developing the paste using a mask of a desired configuration, followed by sintering.

Referring to FIG. 2, the phosphor layers 28 are formed between the ribs 29. The green phosphor of the present invention can be used as a material for the phosphor layers 28. A method for forming the phosphor layers 28 is not particularly limited, but may be a known method. For example, the phosphor layers 28 may be formed by applying a paste of the phosphor dispersed in a solution of a binder in a solvent between the ribs 29 and sintering the paste in the atmosphere.

Next, the front plate and the rear plate are assembled oppositely to each other with the display electrodes (41, 42) crossing the address electrodes A and with the display and address electrodes inside, and a discharge gas is fed into a space defined by the ribs 29. Thus the PDP 100 is produced.

In the above-described PDP, among the ribs, the dielectric layer and the protecting layer which define the discharge space, the phosphor layers are formed on the ribs and the dielectric layer on the rear plate, but phosphor layers may be formed on the protecting film, on the front plate in the same manner.

EXAMPLES

Examples of the present invention are explained in further details by way of the following examples, but the present invention should not be construed to be limited to these examples.

Example 1

Materials in the molar ratios shown below, to which a suitable amount of ethanol had been added, were mixed for three hours.

TABLE 1

| | Molar Ratio | | | | | |
|---|---|---|---|---|---|---|
| Material | Phosphor "a" | Phosphor "b" | Phosphor "c" | Phosphor "d" | Phosphor "e" | Phosphor "f" |
| $BaCO_3$ | 1 | 1 | 1 | 1 | 1 | 1 |
| $Al_2O_3$ | 5 | 5 | 5 | 5 | 5 | 5 |
| ZnO | 0.99 | 0.97 | 0.95 | 0.9 | 0.85 | 0.7 |
| $MnCO_3$ | 0.01 | 0.03 | 0.05 | 0.1 | 0.15 | 0.3 |
| $AlF_3$ | 0.03 | 0.03 | 0.03 | 0.03 | 0.03 | 0.03 |

The mixtures were sintered under a nitrogen atmosphere at 1300° C. for four hours and the resulting sinters were pulverized. Thus, phosphors "a" to "f" represented by $Ba(Zn_{1-x}Mn_x)Al_{10}O_{17}$ ($0.01 \leq x \leq 0.3$) were prepared. The X-ray diffraction analysis of the phosphors confirmed that the phosphors are composed of crystals having a β alumina structure.

Figure 3:
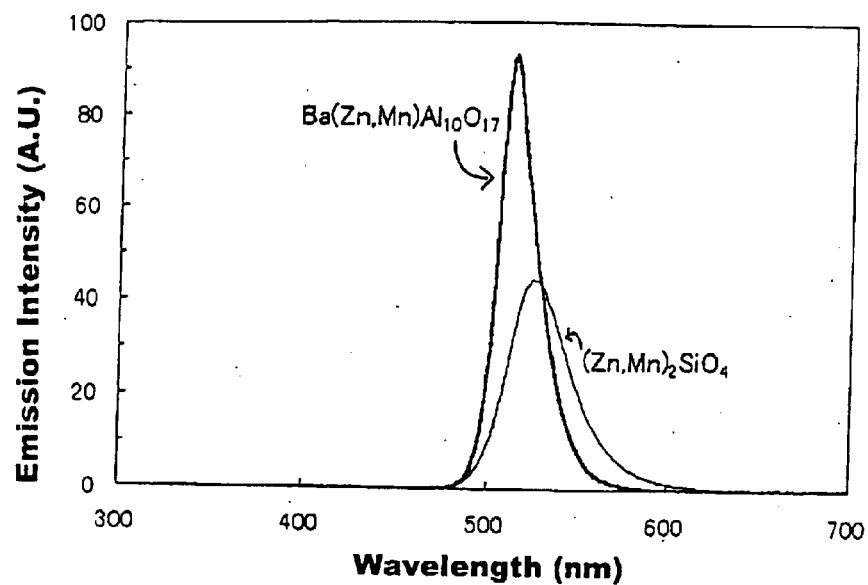
FIG. 3 illustrates emission spectra of phosphors in accordance with Example 1.

In FIG. 3, an emission spectrum was shown when phosphor "c" was irradiated with a light having a wavelength of 147 nm. FIG. 3 shows that phosphor "c" emits a green light. In addition, it is shown that the emission intensity of phosphor "c" is as much as almost twice that of $(Zn, Mn)_2SiO_4$.

Figure 4:
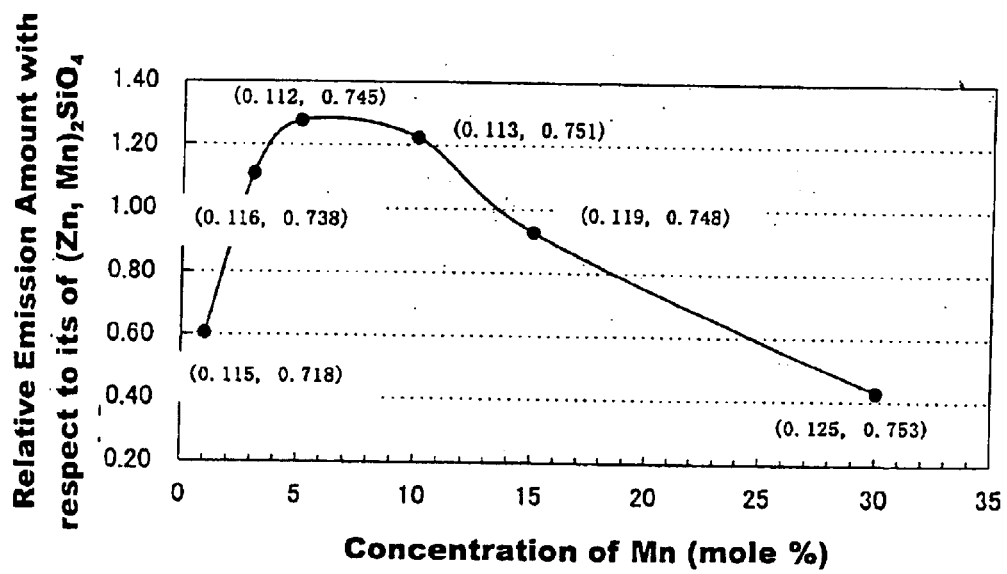
FIG. 4 is a graph showing a dependence of the emission amount of phosphors of Example 1 upon the concentration of Mn.

Furthermore, phosphors "a" to "f" were measured for their emission amounts, each of which is shown in FIG. 4 as a ratio thereof to the emission amount of $(Zn, Mn)_2SiO_4$. In the figure, the chromaticity coordinate (x, y) of each phosphor is also shown. FIG. 4 shows that the molar ratio of Mn preferably ranges from 0.02 to 0.14, particularly preferably, from 0.04 to 0.10. In addition, the fact that phosphors "b" to "d", whose "x" is within the range of the present invention, have chromaticity coordinates of (0.113 to 0116, 0.738 to 0.751) which are closer to (about 0.08, 0.83) of the green color than (0.230, 0.711) of $(Zn, Mn)_2SiO_4$ shows that those phosphors have high color purities.

Example 2

Phosphors "g" to "j" were prepared in the same manner as that in Example 1 using materials in the molar ratios shown below. Phosphor "c" was the same as that of Example 1.

TABLE 2

| | Molar Ratio | | | |
|---|---|---|---|---|
| Material | Phosphor "g" | Phosphor "h" | Phosphor "i" | Phosphor "j" |
| $BaCO_3$ | 0.85 | 0.5 | 0.25 | 0 |
| $SrCO_3$ | 0.25 | 0.5 | 0.75 | 1 |
| $Al_2O_3$ | 5 | 5 | 5 | 5 |
| ZnO | 0.95 | 0.95 | 0.95 | 0.95 |
| $MnCO_3$ | 0.05 | 0.05 | 0.05 | 0.05 |
| $AlF_3$ | 0.03 | 0.03 | 0.03 | 0.03 |

Figure 5:
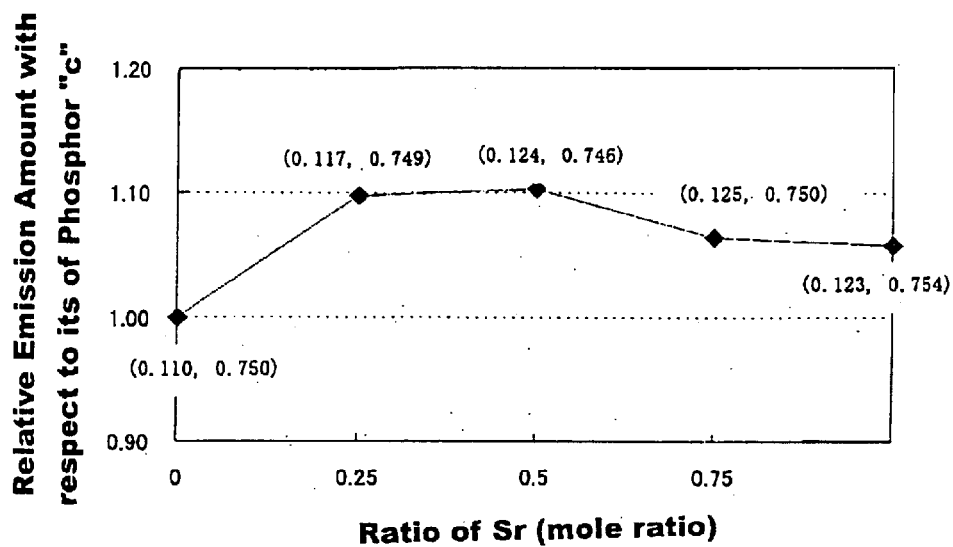
FIG. 5 is a graph showing a dependence of the emission amount of phosphors of Example 2 upon the concentration of Sr.

Phosphors "g" to "j" were measured for their emission amounts, each of which is shown in FIG. 5 as a ratio thereof to the emission amount of phosphor "c". In the figure, the chromaticity coordinate (x, y) of each phosphor is also shown. FIG. 5 shows that to contain Sr can further increase the emission amount.

Figure 6:
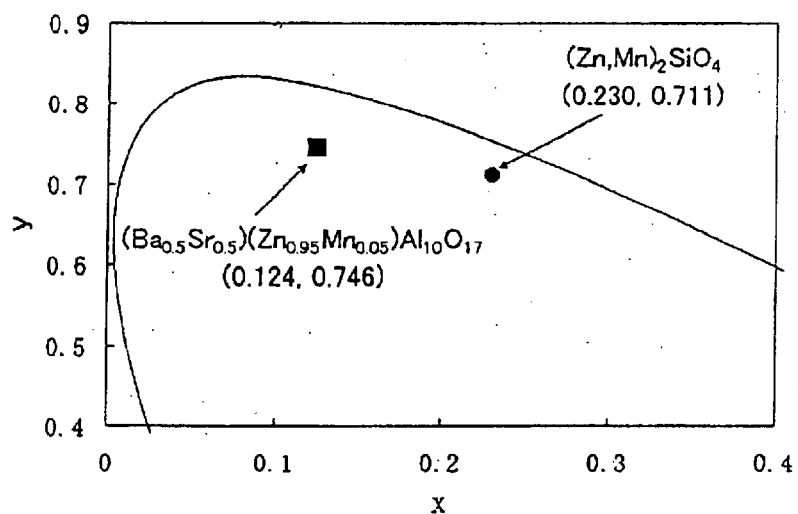
FIG. 6 is a chromaticity diagram of phosphor of Example 2.

The fact that phosphors "g" to "j" have chromaticity coordinates of (0.117 to 0123, 0.746 to 0.754) which are closer to (about 0.08, 0.83) of the green color than (0.230, 0.711) of $(Zn, Mn)_2SiO_4$ shows that those phosphors have high color purities. The chromaticity diagrams of phosphor "h" and $(Zn, Mn)_2SiO_4$ are shown in FIG. 6. In the chromaticity diagrams, the points on the curve in the figure indicate pure colors. The coordinate of the highest "y" value means to be a color of the highest green color purity. FIG. 6 shows that phosphor "h" has a green color purity higher than that of $(Zn, Mn)_2SiO_4$.

Example 3

Using phosphor "c" $[Ba(Zn_{0.95}Mn_{0.05})Al_{10}O_{17}]$, phosphor "h" $[(Ba_{0.5}Sr_{0.5})(Zn_{0.95}Mn_{0.05})Al_{10}O_{17}]$, $(Zn, Mn)_2SiO_4$ and BAM, respectively, PDPs of the following constitutions were prepared.

Construction of PDP:

Display electrodes

Transparent electrode width: 280 μm

Bus electrode width: 100 μm

Discharge gap between display electrodes: 100 μm

Thickness of dielectric layer: 30 μm

Height of ribs: 100 μm

Pitch of ribs: 360 μm

Discharge gas of Ne—Xe (5%)

Gas pressure: 500 Torr

The resulting PDPs were caused to stay on continuously for 500 hours as an accelerated lifetime test. The peak intensity was measured at every lighting period of time. Each of the peak intensity measured is shown in FIG. 7 as a peak intensity relative to the peak intensity at the beginning of lighting.

Figure 7:
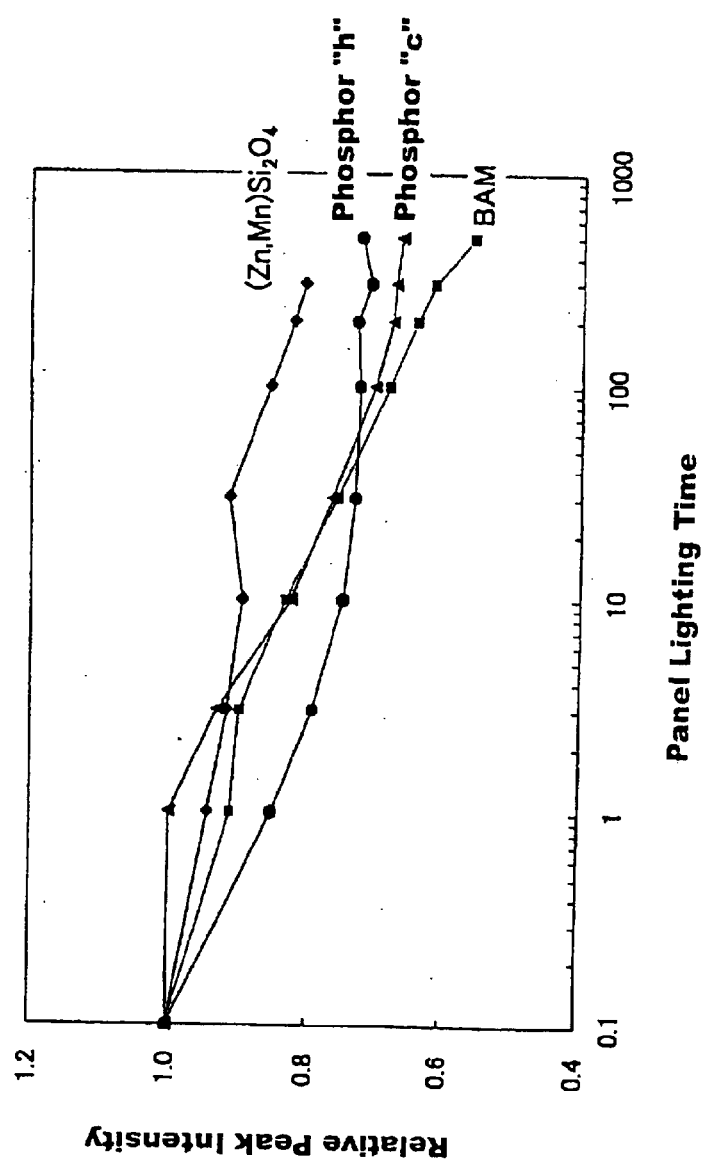
FIG. 7 is a graph showing a relation between a peak intensity and lighting time.

FIG. 7 shows that phosphors "c" and "h" last longer than BAM. Phosphor "c" has a life shorter than $(Zn, Mn)_2SiO_4$, but with respect to color purity, phosphor "c" is better. Furthermore, the fact that phosphor "h" doped with Sr has a longer life than phosphor "c" doped with no Sr shows that addition of Sr can improve the life as well as the emission amount.

The present invention can provide a green phosphor superior in characteristics such as color purity, luminance and life, especially in color purity.

Use of the green phosphor of the present invention which is superior in characteristics such as color purity, luminance and life, especially in green purity, can improve display characteristics of gas discharge devices such as fluorescent lamps and display devices such as PDP, CRT, fluorescent display tubes and X-ray camera tubes.

What is claimed is:

1. A green phosphor represented by the formula:

$A(Zn_{1-x}Mn_x)Al_{10}O_{17}$ wherein A is Ca, Ba or Sr and x is a number satisfying $0.02 \leq x \leq 0.14$.

2. A green phosphor according to claim 1, in which the green phosphor contains a host material and a luminescence center, the host material being a β alumina structure.

3. A green phosphor according to claim 1, which is capable of producing a green fluorescence by applied vacuum ultraviolet radiation.

4. A green phosphor according to claim 1, which is represented by the formula: $(Ba_{1-y}Sr_y)(Zn_{1-x}Mn_x)Al_{10}O_{17}$ ($0.02 \leq x \leq 0.14$, $0 \leq y \leq 1$).

5. A gas discharge device using a green phosphor as set forth in claim 1.

6. A display device using a green phosphor as set forth in claim 1.

* * * * *